United States Patent [19]
Taylor, Jr.

[11] Patent Number: 5,296,150
[45] Date of Patent: Mar. 22, 1994

[54] WATER OIL SEPARATOR

[75] Inventor: Bennett W. Taylor, Jr., Mt. Holly, N.C.

[73] Assignee: Environmental Pretreatment Systems, Inc., Maiden, N.C.

[21] Appl. No.: 917,458

[22] Filed: Jul. 21, 1992

[51] Int. Cl.⁵ ............................................. B01D 17/04
[52] U.S. Cl. ................................... 210/708; 210/804; 210/806; 210/522; 210/DIG. 5
[58] Field of Search ............... 210/265, 702, 708, 767, 210/800, 804, 790, 806, 241, 513, 521, 522, 532.1, 533-538, DIG. 5

[56] References Cited

U.S. PATENT DOCUMENTS

| | | |
|---|---|---|
| 3,797,666 | 3/1974 | Nakanishi et al. ............ 210/265 |
| 3,856,682 | 12/1974 | Summers . |
| 4,072,614 | 2/1978 | Harris . |
| 4,139,463 | 2/1979 | Murphy et al. . |
| 4,149,973 | 4/1979 | Harris . |
| 4,199,451 | 4/1980 | Hsiung et al. . |
| 4,333,835 | 6/1982 | Lynch . |
| 4,396,504 | 8/1983 | Tannenhill . |
| 4,400,274 | 8/1983 | Protos . |
| 4,731,180 | 3/1988 | Huff . |
| 4,867,877 | 9/1989 | Hansen et al. . |
| 4,925,570 | 5/1990 | Schafft . |
| 5,004,537 | 4/1991 | Brown . |

*Primary Examiner*—Frank Sever
*Attorney, Agent, or Firm*—Shefte, Pinckney & Sawyer

[57] ABSTRACT

An apparatus for separating at least one selected medium from a liquid influent stream includes an assembly for dividing the influent stream into a plurality of smaller streams at an interface and means for filtering the smaller streams as they each flow along a discrete flow path substantially distinct from the flow paths of the other smaller streams. The apparatus is particularly suited for removing oils, greases, and suspended solids from a water oil mixture and is of a compact overall shape to permit mobile on-site use of the separator, for example, to remove contaminants from an aqueous mixture drawn out from a contaminated water table. The assembly for dividing the influent stream into smaller streams may include a diffuser plate having a plurality of apertures and the filtering assembly may include a head of oil disposed adjacent the diffuser plate for acting on the smaller streams created by the flow of the influent through the apertures of the diffuser plate.

11 Claims, 3 Drawing Sheets

WATER OIL SEPARATOR

BACKGROUND OF THE INVENTION

The present invention relates to a water oil separator and, more particularly, to a water oil separator of the type for mobile on site use for removing entrained contaminants from a liquid influent.

Concern over the presence of oil and other contaminants in the water table has risen dramatically in recent years. Numerous communities now require the removal of such contaminants before permitting the building of structures or other use of property. Several approaches for removing contaminants from the water table have been developed and find varying degrees of acceptance in actual practice. One approach involves the disposition of mobile on-site water oil separator device for separating oils, greases, and solids entrained in the contaminated aqueous solution drawn up from the contaminated water table.

For example, U.S. Pat. No. 4,333,835 to Lynch discloses a vertical tube coalescer separator of a design which permits transport of the separator to an on-site location. The separator includes a plurality of individual coalescer tubes preferably formed of an oleophilic and hydrophobic material for attracting oil and, simultaneously, repelling water during passage of a water oil mixture through the tubes. As another example, U.S. Pat. No. 4,396,504 to Tannehill discloses a mobile waste oil cleaning apparatus transportable to an on-site location at which a contaminated liquid influent is present.

While mobile separators such as disclosed in the above noted patents may provide satisfactory contaminant removal, the capital cost of such equipment presents a not insignificant burden to those considering cost effective methods of contaminant removal. Thus, the art still seeks improvement in a mobile water oil separator which can efficiently remove oils, greases, solids, and other selected media from a liquid solution in a cost-effective manner.

SUMMARY OF THE INVENTION

The present invention provides a mobile separator apparatus which efficiently removes oils, greases and solids in a highly cost effective manner.

According to the present invention, there is provided an apparatus for separating at least one selected medium from a liquid influent stream which includes means for dividing the influent stream into a plurality of smaller streams at an interface, means for filtering the smaller streams and means for supporting the filtering means. Each smaller stream is of lesser cross-sectional area than the influent stream and the interface being a boundary having one side toward which the influent stream flows and an opposite side away from which each smaller stream flows for at least a predetermined distance along a discrete flow path substantially distinct from the flow path of the other smaller streams.

The means for filtering the smaller streams is operable to remove at least the one selected medium and includes the characteristic of having a greater affinity for the at least one selected medium relative to its affinity for the other media comprising the influent stream such that, upon passage of the smaller streams through the filtering means, the filtering means retains at least one selected medium while the other media of the influent stream passes therethrough. Also, the means for supporting the filtering means supports the filtering means relative to the interface for interception of the smaller streams by the filtering means during the flow of the smaller streams in their discrete flow paths.

According to one aspect of the present invention, the influent stream includes an aqueous medium and the filtering means is hydrophobic. Also, the filtering means includes a liquid solution comprised principally of the at least one selected medium to be removed.

According to one feature of the one aspect of the present invention, the at least one selected medium to be removed is oil and the filtering means includes a head of oil. Preferably, the separating apparatus also includes at least one coalescing filter disposed downstream of the filtering means for promoting the removal of the at least one selected medium still entrained in the influent stream after passage of the smaller streams through the filtering means.

According to further features of the one aspect of the present invention, the separating apparatus includes means for removing the at least one selected medium from a surface of the influent stream by skimming of the at least one selected medium. Additionally, the dividing means includes a plate having a plurality of apertures, the influent stream flowing through the plurality of apertures in the plurality of the smaller streams.

In a particular preferred configuration of the present invention, there is provided means for accumulating the influent stream for subsequent feeding to the dividing means, the accumulation means permitting settling of relatively larger suspended solids entrained in the influent stream. Preferably, the plate is inclined downwardly in a direction outwardly from the accumulating means, the influent stream flowing from the accumulating means downwardly along the plate. Also, there is provided a chassis for supporting the apparatus and wheel means connected to the chassis for mobile transport of the apparatus.

In a further aspect of the present invention, there is provided a method for separating at least one selected medium from a liquid influent stream including dividing the influent stream into a plurality of smaller streams at an interface, each smaller stream being of lesser cross-sectional area than the influent stream and the interface being a boundary having one side toward which the influent stream flows and an opposite side away from which each smaller stream flows for at least a predetermined distance along a discrete flow path substantially distinct from the flow paths of the other smaller streams and filtering the smaller streams to remove at least a portion of the at least one selected medium from the smaller streams while the smaller streams are flowing in their discrete flow paths.

DETAILED DESCRIPTION OF THE PREFERRED EMBODIMENT

Figure 1:
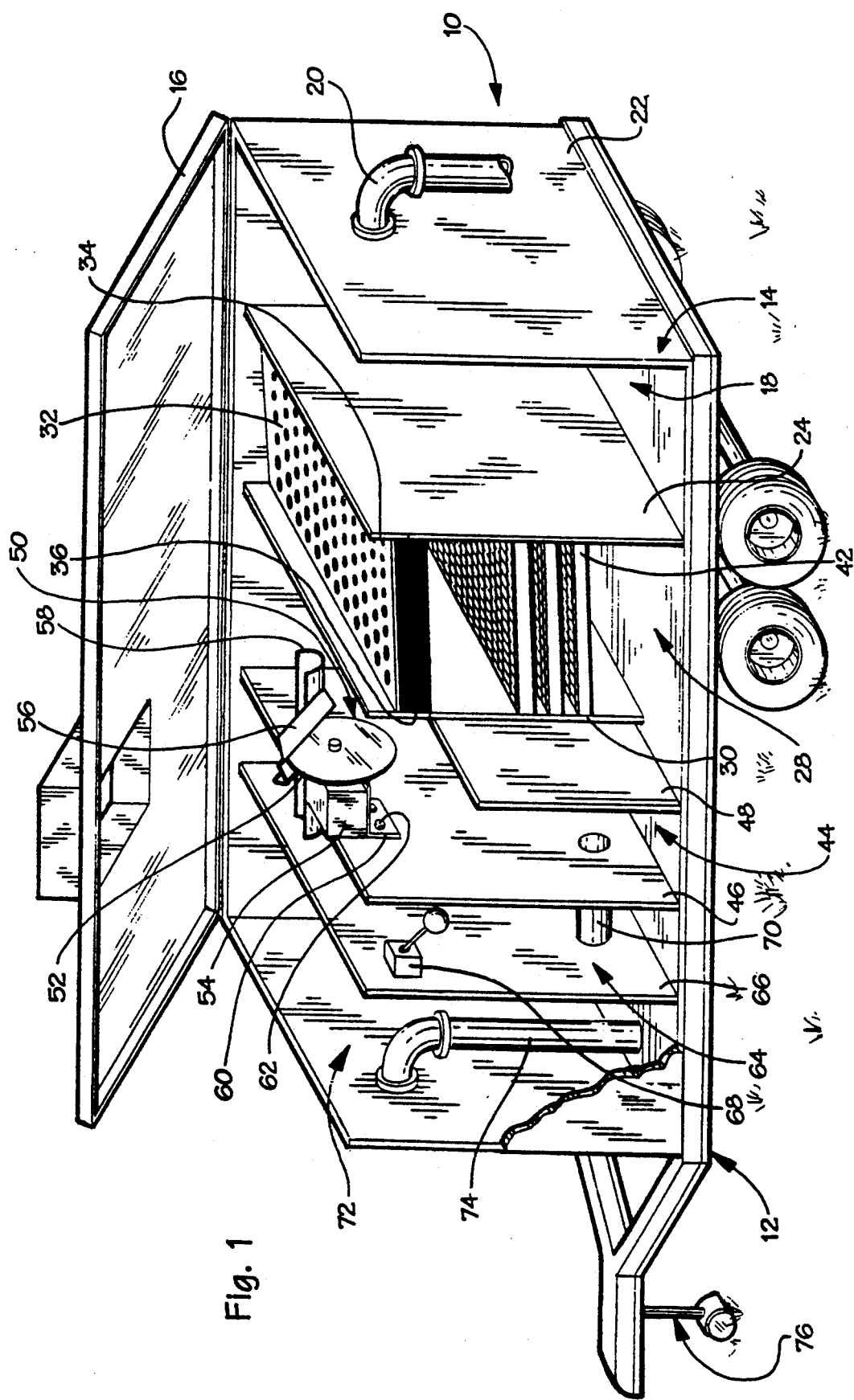
FIG. 1 is a perspective view in partial vertical cutaway, of the preferred embodiment of the media separator apparatus of the present invention.
Figure 3:
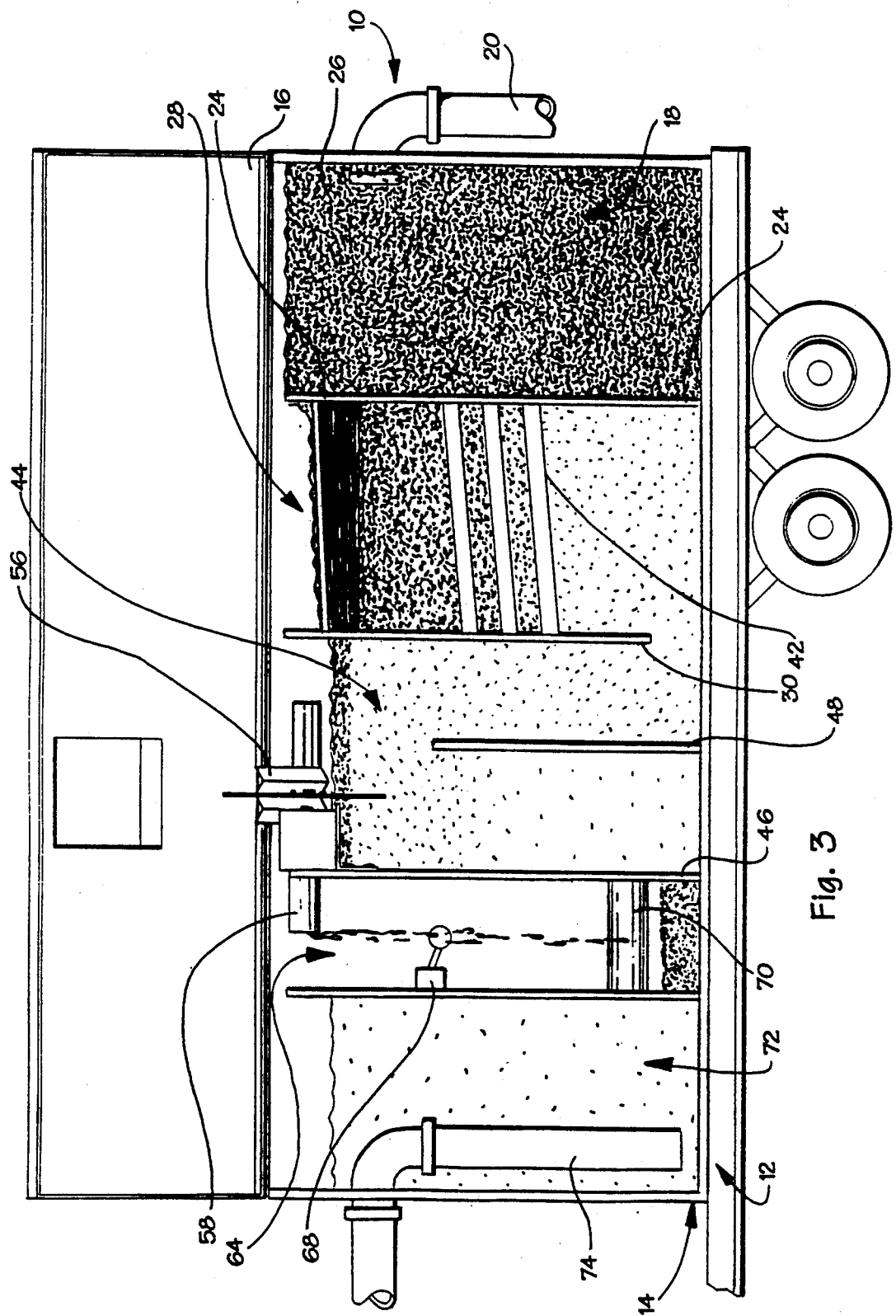
FIG. 3 is a front plan view, in partial vertical section, of the media separator apparatus shown in FIG. 1.

As seen in FIGS. 1 3, the preferred embodiment of the media separator apparatus 10 is preferably configured as a mobile unit supported on a wheeled chassis 12 for convenient transport and deployment of the media separator apparatus to a site at which a fluid mixture is stored or otherwise present—e.g., a plot of land contaminated with fluidic contamination. The media separator apparatus 10 is operable to separate at least one selected medium from an influent stream to thereby render the influent into an effluent which is a more useful or desirable state than the influent. For example, the media separator apparatus 10 can be operated to separate an oil medium from an oil and water influent stream to thereby render an effluent stream substantially free of oil.

With particular reference to FIGS. 1 and 3, the media separator apparatus 10 is of a generally parallelopiped overall shape, though the overall shape of the apparatus is not of importance but can, instead, be selected as appropriate for the particular applications in which the apparatus will be used. For example, the media separator apparatus 10 can have an overall rounded or oblong shape. The media separator apparatus 10 includes a rectangular tank 14 having an open top selectively coverable by a cover 16 hingedly connected to the body of the tank. Preferably, at least the walls of the tank 14 are of a liquid impermeable construction so that each wall has a so-called "wet" side in which liquids are in contact but no leakage or significant corrosion of the wall occurs thereby. One example of a suitable construction of the tank 14 is a tank formed of aluminum plates brazed or welded to one another along adjoining edges.

The interior of the tank 14 is divided into a plurality of influent handling areas, each for altering the composition of the influent, storing the influent, or handling or storing a medium separated from the influent. One of influent handling areas is an accumulation area 18 which is preferably located on a right- or left-handed side of the tank 14 and is communicated with an influent feed conduit 20 in the form of a pipe through which influent is controllably fed via a conventional pump (not shown) or other feed mechanism into the accumulation area 18. The accumulation area 18 is formed by a back end wall 22 of the tank 14, a weir partition 24 extending between and sealingly connected to, the two longitudinal side walls of the tank 14, and the portion of the longitudinal side walls of the tank 14 between the back wall 22 and the weir partition 24.

The weir partition 24 is supported on, and sealingly connected to, the floor of the tank 14 and extends to substantially the same height as the height of the interior of the tank 14, except that the top of the weir partition 24 is at a height below the inner surface of the cover 16 when the cover 16 covers the open top side of the tank 14 to thereby provide a spill-over opening between the cover and the top of the weir partition 24 for influent to spill over the top of the partition into the respective influent handling area adjoining the accumulator area 18. As seen in FIG. 3, the accumulated area 18 retains a predetermined volume of an influent 26 pumped therein through the influent feed conduit 20 for subsequent controlled feeding of the influent in a non-sloshing, non-turbulent manner to a diffuser area 28 adjoining the accumulator area 18.

The diffuser area 28 includes means for dividing the influent 26 which has spilled over the weir partition 24 into a plurality of smaller streams at an interface. The diffuser area 28 also includes means for filtering a selected medium from the influent 26. As seen in FIGS. 1 and 3, the diffuser area 28 is defined by the weir partition 24, a reverse dam partition 30 extending between, and sealingly connected to, the longitudinal sides of the tank 14, and the portion of the longitudinal sides of the tank 14 between the reverse dam partition 30 and the weir partition 24. The reverse dam partition 30 is in the form of a rectangular plate extending to generally the same height as the weir partition 24 but having its lower edge at a vertical spacing from the floor of the tank 14 for passage of the influent 26 which has been handled in the diffuser area 28 through the spacing.

The means for dividing the influent 26 into a plurality of smaller streams at an interface is preferably in the form of a diffuser plate 32 which is supported, along one edge, by a support bracket 32 mounted on the weir partition 24 and, along an opposite edge, by a support bracket 34 mounted on the reverse dam partition 30. The diffuser plate 32 extends substantially across the widthwise extent of the interior of the tank 14 between its two longitudinal side walls and is inclined at a slight inclination to the horizontal in the direction from the weir partition 24 toward the reverse dam partition 30. The thickness of the diffuser plate 32 is selected relative to the type of material of which the plate is formed so that the plate is substantially rigid without significant flexing during handling of the influent. For example, the diffuser plate 32 can be formed of a 3/16" thickness and, preferably, includes an 8 millimeter alkaline and acid resistant coating.

Figure 2:
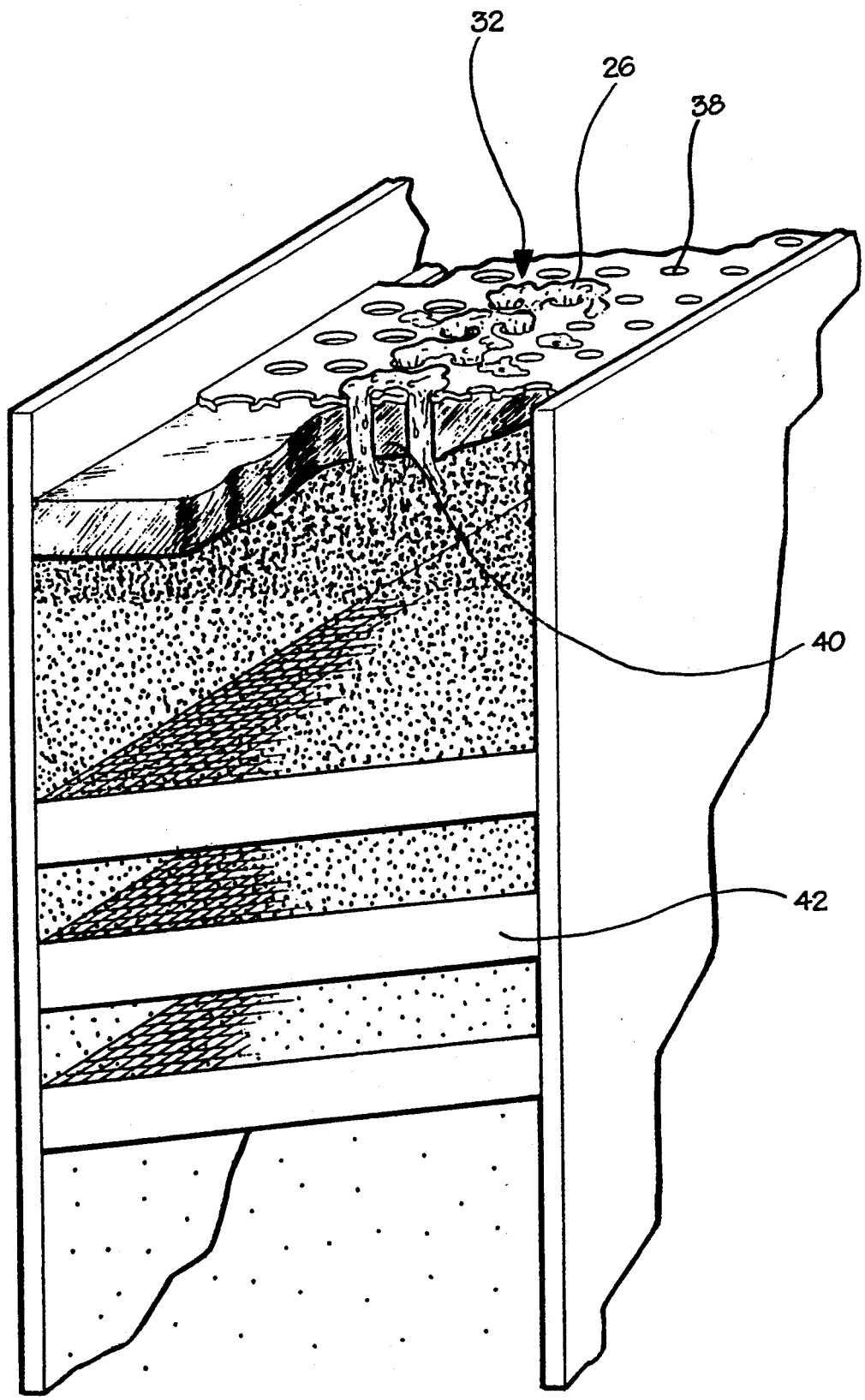
FIG. 2 is an enlarged perspective view of the diffuser area of the media separator apparatus shown in FIG. 1.

As seen in particular in FIG. 2, a plurality of apertures 38 are formed in the diffuser plate 32 and each aperture is circular in shape. Preferably, the diameter of the apertures 38 increases in the direction from the weir partition 24 toward the reverse dam partition 30. The diffuser plate 32 defines an interface at which a stream of the influent 26 is divided into a plurality of smaller streams. Specifically, as seen in FIG. 2 in particular, the diffuser plate 32 divides the streams of the influent 26 spilling over the weir partition 24 into a plurality of smaller streams 40, each of which flows away from the diffuser plate 32 at least a predetermined distance along a discrete flow path substantially distinct from the flow paths of the other smaller streams.

The media separator apparatus 10 also includes a means for filtering a selected medium and the filtering means is located below the diffuser plate 32, in the diffuser area 28. The filtering means has the characteristic of having a greater affinity for the selected medium to be filtered from the influent stream 26 than for the other media of the influent stream which are to remain in the influent stream. As an exemplary application, if the media separator apparatus 10 is to be operated to separate an oil medium from an influent stream also having a water or aqueous medium, the filtering means is selected to have the characteristic of having a greater affinity for attracting oil—i.e., oleophilic—and to be substantially hydrophobic.

The media separator apparatus 10 also includes means for supporting the filtering means relative to the interface at which the influent 26 is divided into the smaller streams 40 such that the filtering means intercepts the selected medium from the smaller streams while the smaller streams flow along their discrete flow paths. The structure and operation of the means will vary according to the type of filtering means used in a particular application to ensure that the filtering means is supported relative to the smaller streams 40 such that the filtering means can act to filter out the selected media while the smaller streams 40 travel in their discrete flow paths.

With reference again to an exemplary application in which the selected medium to be removed from the influent stream 26 is oil (and, if desired, suspended solids), it has been found that a quantity of oil supported adjacent the diffuser plate 32—e.g., a head of oil—acts as a filtering means to filter oil from the influent stream 26. Thus, the filtering means preferably comprises a head of oil and the means for supporting the head of oil relative to the diffuser plate 32 can be the influent 26 itself, in consideration of the fact that the specific gravity of oil is less than the specific gravity of the oil-water mixture comprising the influent 26 so that oil poured into the influent 26 located in the diffuser area 28 will be buoyantly supported on the top of the influent 26 in the diffuser area 28.

The diffuser area 28 also includes a plurality of coalescing filter plates 42 disposed at a location intermediate the filtering means and the floor of the tank 14. As seen in FIG. 1, the coalescing filter plates 42 extend between, and are mounted to, the weir partition 24 and the reverse dam partition 30 and are inclined slightly to the horizontal in a direction from the weir partition 24 toward the reverse dam partition 30. The coalescent plates act to further break up any emulsified oil remaining in the influent 26 as well as to strip suspended solids from the influent.

A supplemental filtering area 44 is provided adjacent the diffuser area 28 for supplementing the filtering action of the filtering means and any auxiliary filtering means such as the coalescing filter plates 42. The supplemental filtering area 44, as seen in FIGS. 1 and 3, is formed by a skimmer support partition 46 extending between, and sealingly connected to, the two longitudinal sides of the tank 14, the reverse dam partition 30, and the portions of the two longitudinal sides of the tank 14 extending between the reverse dam partition 30 and the skimmer support partition 46. The skimmer support partition 46 is sealingly connected to the floor of the tank 14 and extends to a height a few inches below the plane of the cover 16 when the cover is in its closed position. Thus, the skimmer support partition 46 and the weir partition 24, both of which are sealingly connected to the floor of the tank 24, cooperate with the two longitudinal sides of the tank 14 to retain the influent 26 therebetween during handling of the influent by the filtering means, the auxiliary filtering means, and during supplemental filtering as described in more detail below.

The supplemental filter area 44 also includes a riser partition 48 extending between, and sealingly connected to, the two longitudinal sides of the tank 14 at a location intermediate the reverse dam partition 30 and the skimmer support partition 46 and extending to a height below the height of the skimmer support partition 46. The riser dam 48 cooperates with the reverse dam partition 30 to promote upward movement of the influent 26 in a manner described in more detail below.

The skimmer support partition 46 supports a skimmer assembly 50 which is operable to supplement the filtering action of the filtering means and the auxiliary filtering means in the diffuser area 28. As best seen in FIG. 1, the skimmer assembly 50 may be a conventional skimmer assembly comprising a rotating disk 52 rotatably mounted to the shaft of a drive motor 54, a disk wiper member 56, and a trough 58. The drive motor 54 is supported on a support bracket 60 mounted via bolts 62 to the skimmer support partition 46 at a height selected to allow the disk 52, which is rotated about a horizontal axis, to be partially submerged in the influent 26 retained in the supplemental filter area 44. The trough 58 extends parallel to the axis of rotation of the disk 52 and extends from a location adjacent the disk to the far side of the skimmer support partition 46, as seen in FIG. 3, for conducting skimmed material which has been wiped from the disk 52 by the disk wiper member 54 to a discharge collection area 64.

Due to its partially submerged disposition, the disk 52 continuously intercepts oils, greases, and solids, or other selected media which may have been buoyed or driven to the top of the influent 26 in the supplement filter area 44 and the oils, greases, and solids which adhere to the surface of the disk 52 are wiped by the disk wiper member 56 from the disk to thereafter fall into the trough 58. However, while the preferred embodiment has been described with respect to a conventional skimmer assembly, the present invention also contemplates that any other appropriate media removal device can be used in the supplemental filter area 44 to remove oils, greases, solids, or other selected media which still remain in the influent 26 which has flowed into the supplemental filter area 44.

The media separator apparatus 10 also includes a discharge collection area 64, as seen in FIGS. 1 and 3, formed by a discharge partition 66 extending between, and sealingly connected to, the two longitudinal sides of the tank 14, the skimmer support partition 46, and the portion of the two longitudinal sides of the tank 14 extending between the skimmer support partition 46 and the discharge partition 66. The discharge collection area 64 collects oils, greases, solids, and other selected media which have been skimmed from the influent 26 in the supplemental filter area 44 and discharged from the downstream end of the trough 58. A conventional fluid level detection device, such as a conventional float valve device 68, is mounted to the discharge partition 66 for detecting the accumulation of discharged media beyond a predetermined level. The float valve device 68 can be operatively connected to an appropriate alarm device such as, for example, a flashing light (not shown), to provide an indication to an operator that a predetermined volume of discharged media has collected in the discharge collection area 64 so that the operator can schedule or undertake any necessary steps to clear out the accumulated discharged media from the discharge collection area 64.

A pass-through conduit 70 in the form of a cylindrical pipe extends between, and is respectively mounted to, the skimmer support partition 46 and the discharge partition 66 for passage of influent 26 from the supplemental filter area 44 through the discharge collection area 64 to a clarified influent holding area 72. The clarified influent area 72 is formed by the discharge partition 66, an end wall of the tank 14, and the portion of the two longitudinal sides of the tank 14 extending between the discharge partition 66 and the respective end wall of the tank 14. An outlet conduit 74 in the form of an L-shaped pipe is supported by the respective end wall of the tank 14 and extends into the clarified influent area 72. The outlet conduit 74 can be coupled to a conventional siphon or pumping source (not shown) for drawing the clarified influent pooled in the clarified influent area 72 through the outlet conduit 74. The pass-through conduit 70 permits the influent 26 which has accumulated in the supplemental filter area 44 to pass through the discharge collection area 64 directly to the clarified influent area 72 without contamination by the discharged media being collected in the discharge collection area 64.

The media separator apparatus 10 is operable as follows to separate selected media from a liquid influent stream. The media separator apparatus 10 is particularly suited to handling a liquid influent such as an oil-water mixture drawn from a contaminated water table since the media separator apparatus is readily transportable to the location of the contaminated water table for direct treatment of the oil-water mixture without the requirement for any significant intermediate storage and transport of the oil water mixture. In the event that the media separator apparatus 10 is to be operated in such an on-site manner, the media separator apparatus is parked at the site with the chassis 12 being properly leveled such as, for example, by a trailer dolly wheel 76 as seen in FIG. 1, such that the floor of the tank 14 is substantially horizontal. The influent feed conduit 20 is then connected to the pump or other device which draws out the oil-water mixture from the contaminated water table or from an intermediate storage arrangement such as a drum and the feed of the influent 26 into the accumulated area 18 is commenced. During operation, the cover 16 is preferably disposed in its closed position although, depending upon the monitoring needs and the flow characteristics of the influent 26, the cover 16 can be disposed in its open position during operation, if desired.

The volume of the influent 26 into the accumulated area 18 eventually reaches a level at which the influent 26 spills over the weir partition 24 into the diffuser area 28. The rate of feed of the influent 26 into the accumulation area 18 is preferably controlled according to the characteristics of the influent to permit settling of relatively large solids suspended in the influent to settle toward the bottom of the accumulation area 18. As the need arises, a pumping operation can be performed to draw out these settled solids from the bottom of the accumulation area 18 to thereby periodically cleanse the accumulation area.

As the influent 26 spills over the weir partition 24, the spilled over influent flows along the surface of the diffuser plate 32 due to the slight downward inclination of the diffuser plate and some of the influent flows downwardly through those apertures 38 more closely adjacent the weir partition 24. Preferably, the flow of the influent over the diffuser plate 32 occurs in a relatively non turbulent manner with some of the influent initially flowing through those apertures 38 adjacent the weir partition 24 and the balance of the spilled over influent substantially entirely flowing through the other apertures 38 before the spilled over influent has reached the reverse dam partition 30. Otherwise, if the spilled over influent does not substantially entirely flow through the apertures 38 during its initial flow over the diffuser plate 32, some of the spilled over influent washes back due to impact with the reverse dam partition 30 and collides with other spilled over influent 26 to create a turbulent condition.

The volume and characteristics of the oil disposed in the diffuser area 28 to form the oil head is selected such that the resulting oil head effects an efficient filtering of the entrained oil in the influent 26. In particular, consideration must be given to the thickness of the oil head (relative to the direction of flow of the smaller streams 40 therethrough), the viscosity of the oil comprising the oil head, the relative spacing between the oil head and the diffuser plate 32, the cross sectional area and intra stream spacing of the smaller streams 40, and the flow velocity of the influent 26 against the diffuser plate 32 in providing an oil head in the diffuser area 28. It is important that the head of oil resists any tendency of the smaller streams 40 to diffuse from their discrete flow paths to recombine with one another. By maintaining the smaller streams 40 in their discrete flow paths during their travel through the oil head, it is believed that the oil head is able to effect a more efficient filtering of the oils (and, in some instances, suspended solids) entrained in the influent 26. Factors such as the size and intra-aperture spacing of the apertures and the flow velocity of the influent 26 at the time of its impact on the diffuser plate 32 also affect the ability of the smaller streams 40 to continue to travel in their discrete flow paths through the head of oil.

While it is desirable that little or no recombination of the smaller streams 40 with one another occurs as the smaller streams 40 travel through the head of oil, the filtering action of the head of oil still exerts some filtering action on the influent 26 even if there is some recombination of the smaller streams 40 during their travel through the head of oil. Also, the increasing diameter of the apertures 38 in the direction from the weir partition 24 toward the reverse dam partition 30 promotes a distribution of the influent 26 flowing over the diffuser plate 32 in which the influent flowing into those apertures 38 most closely adjacent the weir partition 24 (e.g., the relatively smaller diameter holes) permit only a relatively minor portion of the incoming influent 26 to flow through the diffuser plate 32 while allowing the solid portions of the diffuser plate to dissipate the impact of the incoming influent. As the influent flows along the diffused plate 32, the increasingly larger diameter apertures 38 permit relatively more of the influent 26 to pass through the diffuser plate at a relatively lesser velocity than the influent which has already passed through the smaller diameter apertures 38. This manner of passage of the influent 26 through the diffuser plate 32 reduces the risk that the smaller streams 40 will flow at too high a velocity into the head of oil. If a smaller stream 40 impacts the head of oil at too high a flow velocity, turbulent action may occur which diffuses or breaks up the smaller stream and thereby prevents the smaller streams from flowing in their discrete flow paths through the head of oil for optimum stripping of the entrained oil by the head of oil.

As seen in particular in FIG. 2, the influent 26 is diffused into a plurality of the smaller streams 40 by its flow through the apertures 38. The head of oil, which is disposed immediately below the diffuser plate 32, acts on the smaller streams 40 to strip oil (and, depending upon the characteristics of the head of oil and the influent, to strip suspended solids) from the smaller streams 40. The head of oil retains the stripped oils and suspended solids while the smaller streams 40 continue to flow downwardly in the diffuser area 28. After their travel through the head of oil, the smaller streams 40 recombine with one another below the head of oil and are driven downwardly by the action of subsequently following volumes of the influent 26 into contact with the coalescing filter plates 42. The coalescing plates 42 strip additional suspended solids, oil, and other media from the influent 26, thereby further clarifying the influent.

The influent 26 passes under the reverse dam partition 30 and collides with the riser partition 48, which cooperates with the reverse dam partition 30 to guide the influent 26 upwardly in the supplemental filter area 44. The influent 26 subsequently flows upwardly over the top of the riser partition 48. During the flow of the influent 26 through the supplemental filter area 44, oils and other suspended solids which have been sufficiently broken free from their entrainment with the influent 26 float to the surface of the influent and are picked up from the surface of the influent by the skimming action of the skimmer assembly 50. These removed oil and other media flow along the trough 58 to fall into the discharge collection area 64, which is periodically cleaned of any build-up of the accumulated discharged oils and other media.

The influent 26 flowing downwardly between the riser partition 48 and the skimmer support partition 46 eventually flows through the pass-through conduit 70 through the discharge collection are 64 without exposure thereto into the clarified influent area 72. The clarified influent in the clarified influent area 72 is drawn out through the outlet conduit 74 and returned to the site or flowed into containers (not shown) for storage or subsequent further handling.

As the following Tables A and B illustrate, the media separator apparatus 10 has shown itself to be highly effective in reducing the biological oxygen demand (BOD), free and emulsified oils, fats, and grease in a liquid medium. Tables A and B each show the weight per volume of the various contaminants in the influent and the weight per volume of the same contaminants in the effluent.

TABLE A

| TEST PARAMETER | UNITS | TEST RESULT | DETECTION LIMIT |
|---|---|---|---|
| INFLUENT | | | |
| Biological Oxygen Demand, 5 Day | mg/L | 2333.0 | 1.0 |
| Total Non-Filterable Residue | mg/L | 5290.0 | 10.0 |
| Free Oil | % | 3.0 | .1 |
| Emulsified Oil | mg/L | 1863.0 | 1.0 |
| EFFLUENT | | | |
| Biological Oxygen Demand, 5 Day | mg/L | 991.0 | 1.0 |
| Total Non-Filterable Residue | mg/L | 46.0 | 10.0 |
| Free Oil | % | <1.0 | .1 |
| Emulsified Oil | mg/L | 215.0 | 1.0 |

TABLE B

| TEST PARAMETER | UNITS | TEST RESULT | DETECTION LIMIT |
|---|---|---|---|
| INFLUENT | | | |
| Biological Oxygen Demand, 5 Day | mg/L | 3091.0 | 1.0 |
| Total Non-Filterable Residue | mg/L | 440.0 | 10.0 |
| Free Oil | % | <1.0 | .1 |
| Emulsified Oil | mg/L | 483.0 | 1.0 |
| Fats, Oil and Grease | mg/L | 641.0 | 5.0 |
| EFFLUENT | | | |
| Biological Oxygen Demand, 5 Day | mg/L | 690.0 | 1.0 |
| Total Non-Filterable Residue | mg/L | 53.0 | 10.0 |
| Free Oil | % | <1.0 | .1 |
| Emulsified Oil | mg/L | 80.0 | 1.0 |
| Fats, Oil and Grease | mg/L | 71.0 | 5.0 |

It will therefore be readily understood by those persons skilled in the art that the present invention is susceptible of a broad utility and application. Many embodiments and adaptions of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for use in aiding the separating a liquid which includes first and second phases; said first phase being less dense than said second phase; said apparatus comprising: a chamber for aiding in coalescing said first phase, further comprising elements including substantially imperforate sides, a top for receiving said liquid, formed of a substantially imperforate plate having spaced apertures therein, and a bottom open to at least one other coalescing stage; said elements being spaced, sized and dimensioned to allow the influent stream therefrom to reach a steady state and for maintaining a layer of said first phase of sufficient depth for promoting said coalescing after operation of said apparatus has reached steady state.

2. Apparatus for separating at least one selected medium according to claim 1 wherein the influent stream includes an aqueous medium and the said first phase is hydrophobic.

3. Apparatus for separating at least one selected medium according to claim 1 wherein the said first phase includes a liquid solution comprised principally of the at least one selected medium to be removed.

4. Apparatus for separating at least one selected medium according to claim 3 wherein the at least one selected medium to be removed is oil and the said first phase includes a head of oil.

5. Apparatus for separating at least one selected medium according to claim 1 and further comprising at least one coalescing filter disposed downstream of the said first phase for promoting the removal of the at least one selected medium still entrained in the influent stream after passage of the smaller streams through the said first phase.

6. Apparatus for separating at least one selected medium according to claim 5 and further comprising device for removing the at least one selected medium from a surface of the influent stream by skimming of the at least one selected medium.

7. Apparatus for separating at least one selected medium according to claim 1 wherein the imperforate plate includes a plate having a plurality of apertures, the influent stream flowing through the plurality of apertures in the plurality of the smaller streams.

8. Apparatus for separating at least one selected medium according to claim 7 and further comprising a device for accumulating the influent stream for subsequent feeding to the imperforate plate, the accumulation device permitting settling of relatively larger suspended solids entrained in the influent stream.

9. Apparatus for separating at least one selected medium according to claim 8 wherein the imperforate plate is inclined downwardly in a direction outwardly from the accumulating device, the influent stream flowing from the accumulating device downwardly along the imperforate plate.

10. Apparatus for separating at least one selected medium according to claim 9 and further comprising a chassis for supporting the apparatus and wheel means connected to the chassis for mobile transport of the apparatus.

11. A method comprising: providing an apparatus for use in aiding the separating a liquid which includes first and second phases; said first phase being less dense than said second phase; said apparatus comprising: a chamber for aiding in coalescing said first phase, further comprising elements including substantially imperforate sides, a top for receiving said liquid, formed of a substantially imperforate plate having spaced apertures therein, and a bottom open to at least one other coalescing stage; said elements being spaced, sized and dimensioned to allow the influent stream therefrom to reach a steady state and for maintaining a layer of said first phase of sufficient depth for promoting said coalescing after operation of said apparatus has reached steady state, feeding said liquid to the top of said chamber, and withdrawing a product richer in said second phase from the bottom of said chamber.

* * * * *